(12) United States Patent
Jorgensen

(10) Patent No.: US 9,300,759 B1
(45) Date of Patent: Mar. 29, 2016

(54) API CALLS WITH DEPENDENCIES

(71) Applicant: Amazon Technologies, Inc., Reno, NV (US)

(72) Inventor: Andrew James Jorgensen, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 413 days.

(21) Appl. No.: 13/733,705

(22) Filed: Jan. 3, 2013

(51) Int. Cl.
*G06F 15/16* (2006.01)
*H04L 29/06* (2006.01)
*G06F 9/54* (2006.01)

(52) U.S. Cl.
CPC .............. *H04L 67/40* (2013.01); *G06F 9/541* (2013.01)

(58) Field of Classification Search
CPC .............................. G06F 9/541; H04L 51/046
See application file for complete search history.

(56) References Cited

U.S. PATENT DOCUMENTS

| | | | |
|---|---|---|---|
| 8,271,996 B1 * | 9/2012 | Gould et al. | 719/312 |
| 2011/0209162 A1 * | 8/2011 | Machiraju et al. | 719/328 |
| 2012/0089700 A1 * | 4/2012 | Safruti et al. | 709/217 |

* cited by examiner

*Primary Examiner* — Yves Dalencourt
(74) *Attorney, Agent, or Firm* — Baker & Hostetler LLP

(57) ABSTRACT

Techniques are disclosed for a client-and-server architecture where the client makes asynchronous API calls to the client. Where the client makes multiple asynchronous API calls, and where these API calls have dependencies (i.e., a result of one call is used as a parameter in a second call), the client may send the server these multiple asynchronous API calls before execution of a call has completed. The server may then execute these multiple asynchronous API calls, using a result generated from one call as a parameter to another call.

25 Claims, 5 Drawing Sheets

API CALLS WITH DEPENDENCIES

BACKGROUND

An application programming interface (API) is a specification that sets forth routines that may be invoked, and how those routines may be invoked. Calls to a particular API may then be used to effectuate the performance of certain tasks. For instance, a client computer and a server computer may be communicatively coupled via a network, and the client may send the server calls in an API that the server implements. In turn, the server may receive these calls, and perform the associated processing.

BRIEF DESCRIPTION OF THE DRAWINGS

Various embodiments in accordance with the present disclosure will be described with reference to the drawings, in which.

DETAILED DESCRIPTION OF ILLUSTRATIVE EMBODIMENTS

Figure 1:
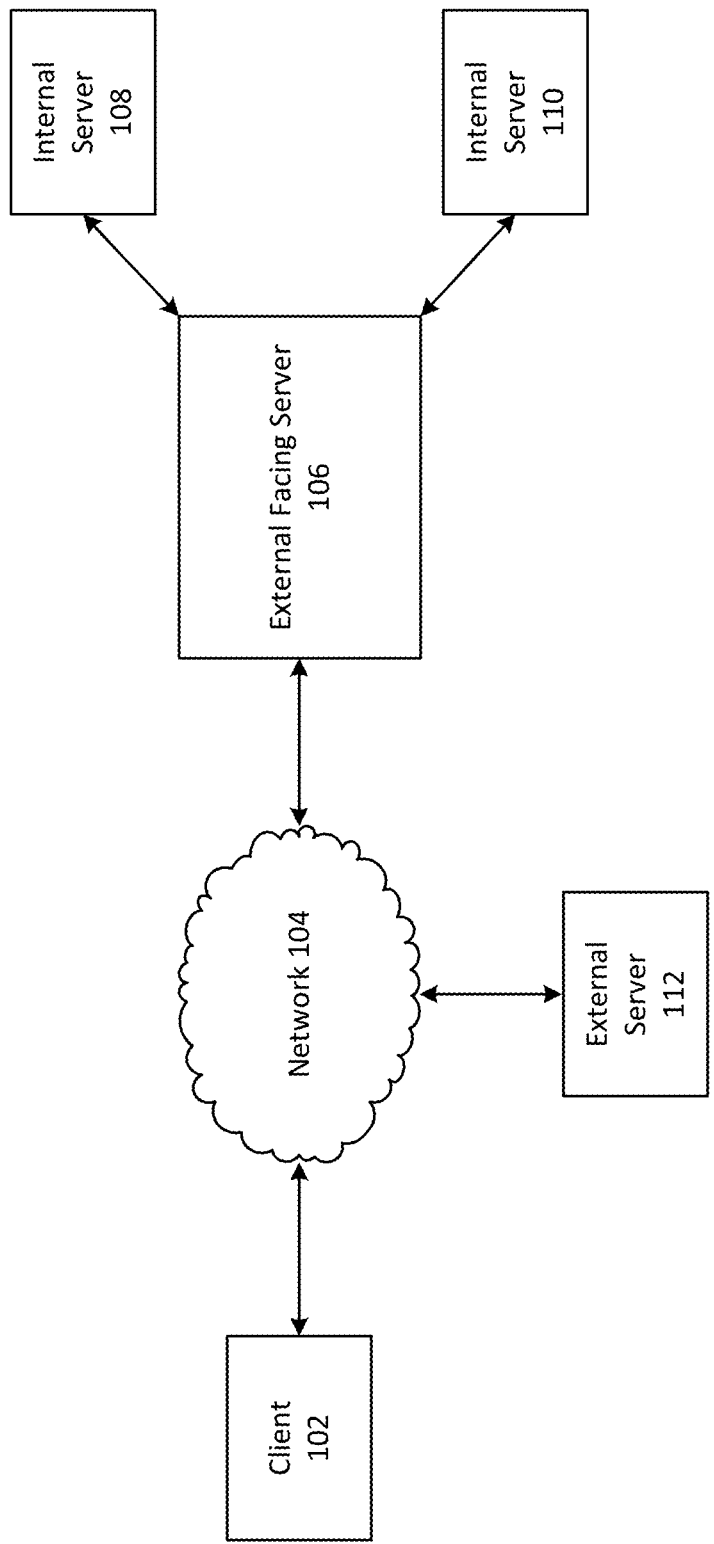
FIG. 1 depicts an example system in which API calls with dependencies may be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to techniques for allowing interaction with a web service, such as data storage service. For example, a computing service that offers processing (through the use of virtual machines) and data storage services is accessible through an application programming interface (API) that is usable by requestors of the computing service to access various capabilities of the computing service. Requestors may, for instance, use one or more APIs to store data, retrieve stored data, and perform processing on this data, such as by executing virtual machine instances on the computing service and performing various operations via these executing virtual machine instances.

In an embodiment, one or more APIs of a computing service allows users to upload virtual machine volumes, register, start and execute instances of these virtual machine volumes, and take snapshots of these virtual machine volumes. An API call may, for example, include a location where the virtual machine volume is to be uploaded from along with parameters for its storage.

In an embodiment, a computing service performs certain API calls asynchronously. API calls may be broadly divided into two groups—synchronous and asynchronous. With a synchronous API call, the calling process waits until it receives a response to the synchronous API call. That is, a synchronous API call will block the caller until it returns. With an asynchronous API call, control returns to the caller before a result has been returned from the API call. The caller may then specify a callback function to call to determine that the operation has completed, and what result, if any, has been obtained. It may be that a callback is called before the asynchronous API call has completed, in which case multiple callbacks may be called to determine that the operation has completed. That is, an asynchronous API call is non-blocking.

For example, a computing service may, for various reasons related to efficiency and/or cost, provide requested processing in an asynchronous manner. Accordingly, in an embodiment, an API for the computing service allows a user to make an API call to request that a virtual machine instance be started. In response, the computing service may provide, to the requestor, an identifier of a job corresponding to starting the virtual machine instance. The computing service may then begin starting the virtual machine instance. When the job is completed, i.e., the virtual machine instance has been started, the identifier of the job may be provided in an API call from the requestor to request that the computing service inform the requestor of the status of the running virtual machine instance.

The requestor may become aware of the job completion in one or more ways. For example, an API call may specify parameters for notifications related to the job, such as when the job is complete or fails. The requestor may receive a notification when the job completion has finished. The notifications may be received by the computer system that submitted the API call to start the virtual machine instance that is specified in notification parameters, such as by email address, internet protocol (IP) address, and the like. The requestor may also submit an API call to poll the computing service for the status of one or more jobs. Such an API call may include one or more job identifiers. In response to such a call, the computing service may provide the status of a job specified by identifier in the call. The status may specify, for example, that the job is in progress, that the job has failed (possibly with information about the reason for failure), that the job has completed, and/or other statuses. The requestor may also, in some embodiments, assume that a job has completed after the passage of time. A computing service, for example, may comply with a service-level agreement (SLA), which specifies that certain jobs will be completed in a specified period of time, such as 24 hours, although other times are within the scope of the present disclosure. With such an SLA (or possibly without), a requestor may wait an appropriate period of time before requesting the output of a job, such as requested data. If the output is not ready, the request may fail.

Notifications may also be provided for events other than job completions. For example, in an embodiment, requestors are able to, via an API call, register for various notifications in connection with processing performed by a computing service. The computing service may maintain one or more logs regarding processing that it performs. The service may maintain the logs according to its own parameters and/or parameters provided by a requestor.

In some embodiments, requestors are able to provide their own information to be associated with jobs. A requestor may, for example, submit an API call to initiate a job, such as a virtual machine volume upload job. A parameter of the API call may include information that the requestor desires to have associated with the job to be initiated. The data storage service may associate the data with the job to provide later in connection with the job, such as in a notification when a job completes and/or with responses to API calls to get the output of the job. Such requestor-provided information may be used in various ways.

In addition, various embodiments of the present disclosure allow for advanced functionalities. For example, a requestor may be able to, using a job tag component of the API, provide its own tags for jobs that are created in response to customer API calls. The tags may be predefined and selected by the requestor and/or may be completely configurable by the requestor. For instance, a requestor may include programming code and/or other information in a tag such that, when a computing service receives a notification message, the computing service can process the information and perform one or more actions in an automated fashion. For instance, a requestor may use the job tag component to include information for a retrieval job that, when processed by a requestor, cause a requestor to download a corresponding data object when the retrieval job is completed.

A customer may request the performance of any of the above operations by sending API requests to the computing system. Similarly, the computing system may provide responses to customer requests. Such requests and responses may be submitted over any suitable communications protocol, such as Hypertext Transfer Protocol (HTTP), File Transfer Protocol (FTP), and the like, in any suitable format, such as Representational State Transfer (REST), Simple Object Access Protocol (SOAP), and the like. The requests and responses may be encoded, for example, using Base64 encoding, encrypted with a cryptographic key or the like.

The following is an example API call and response to determine the status of two virtual machine instances, i-43a4412a and i-23a3397d. An API call may be made via a HTTPS (hypertext transfer protocol secure) protocol using a URL (uniform resource locator), as follows:

https://[example website].com/?Action=MonitorInstances&InstanceId.1=i-43a4412a&InstanceId.2=i-23a3397d&AUTHPARAMS This request enables the monitoring of the status of a running virtual machine instance. The request may identify the server to which the API call is directed ([example website].com), the type of API call that is requested (MonitorInstances), and an identifier of the two instances for which monitoring is requested (i-43a4412a and i-23a3397d). The type of API call that is requested, as well as the identifier of the two instances for which monitoring is requested are contained within a query string in the URL—the portion to the right of the "?" in the URL. A server that receives such a URL may run a program and pass the query string to the program for processing.

After performing processing in accordance with the query string, the server may return a result to the requestor. Where the API call is asynchronous, the server may return the result after it has completed the processing, and in response to receiving a callback API request from the requestor. The following is an example result that the server may return to the requestor:

```
<MonitorInstancesResponse xmlns="http://[example website].com/doc/2012-08-15/">
    <requestId>59dbff89-35bd-4eac-99ed-be587EXAMPLE</requestId>
    <instancesSet>
        <item>
            <instanceId>i-43a4412a</instanceId>
            <monitoring>
                <state>pending</state>
            </monitoring>
        </item>
        <item>
            <instanceId>i-23a3397d</instanceId>
            <monitoring>
                <state>pending</state>
            </monitoring>
        </item>
    </instancesSet>
</MonitorInstancesResponse>
```

As depicted, the result is formatted in XML (extensible markup language)—a markup language that defines a set of rules for encoding documents in a format that is both human-readable and machine-readable. The first line of the response identifies the type of response (MonitorInstancesResponse) and defines the namespace for the XML file (xmlns="http://[example website].com/doc/2012-08-15"). A namespace is generally an identifier that allows for the disambiguation of homonym identifiers. A tag and associated value identifies the request being responded to (<requestId>59dbff89-35bd-4eac-99ed-be587EXAMPLE</requestId>). This may enable the requestor to distinguish between responses where the requestor makes multiple Monitorinstances requests. Then, there is a section that identifies each instance (e.g., <instanceId>i-43a4412a</instanceId>) along with an associated state of that instance (<state>pending</state>).

FIG. 1 depicts an example system in which API calls with dependencies may be implemented. As depicted, three computers are connected through network 104. These three computers are client 102, external facing server 106, and external server 112. In turn, two computers are connected to network 104 through external facing server 106—internal server 108 and internal server 110. External facing server 106, internal server 108, and internal server 110 may all be part of the same entity's infrastructure—e.g., they may operate in concert to implement services for an entity. In an embodiment, external facing server 106 may interact with outside computers (such as client 102) and issue instructions to internal server 108 and internal server 110. Internal server 108 and internal server 110 may then perform actions in response to those instructions. For instance, internal server 108 may host virtual machine instances, and internal server 110 may store snapshots of virtual machine instances.

Given this architecture, when client 102 issues requests to external facing server 106 to start a virtual machine instance, and then save a snapshot of that virtual machine instance, external facing server 106 may issue instructions to internal server 108 and internal server 110 to effectuate these operations. For instance, external facing server 106 may first issue a command to internal server 108 to start a virtual machine instance. After external facing server 106 determines that internal server 108 has started the virtual machine instance, external facing server 106 may issue a command to internal server 110 to store a snapshot of the virtual machine instance. In embodiments, external facing server 106 may send this snapshot to internal server 110. In other embodiments, external facing server 106 may instruct internal server 110 to fetch a snapshot from internal server 108, or external facing server 106 may instruct internal server 108 to send a snapshot to internal server 110. Likewise, in embodiments the computer that runs a VM may differ from the computer that hosts a physical disk for the VM. Where a snapshot request is received in such an embodiment, the snapshot may be taken by the computer hosting the physical disk, and then sent to another computer for storage of that snapshot.

In this manner, client 102 may send external-facing server 106 a plurality of dependent API calls (here, the call to take a snapshot may be considered to be dependent upon the call to start the virtual machine instance, since a snapshot is taken of the virtual machine instance after the virtual machine instance has started), and external-facing server 106 may implement these dependent API calls in order without additional input from client 102. The dependent calls may be thought of as having a parent/child relationship, where a child call uses as a parameter a result that is obtained by processing the parent call.

In addition to implementing API calls using internal server 108 and internal server 110, external facing server 106 may implement the API calls via another computer altogether—such as external server 112. For instance, using the above example of starting a virtual machine instance and then taking a snapshot of that virtual machine image, it may be that a snapshot of the virtual machine is stored on external server 112. In such a case, external facing server 106 may fetch a copy of the snapshot of the virtual machine stored on external server 112, and then use that retrieved snapshot to start an instance of the virtual machine on internal server 108.

In other embodiments, an external facing server may receive a request to launch a VM, and send the request to a service that is responsible for launching and terminating instances. Likewise, a separate service may take a snapshot of a VM when the VM is up and running. That is, embodiments of the invention may include using separate services to carry out functions like launching VMs and generating snapshots within a service provider environment. More generally, FIG. 1, as well as the other figures, depicts simplified embodiments to illustrate concepts, and specific implementations may vary.

Figure 2:
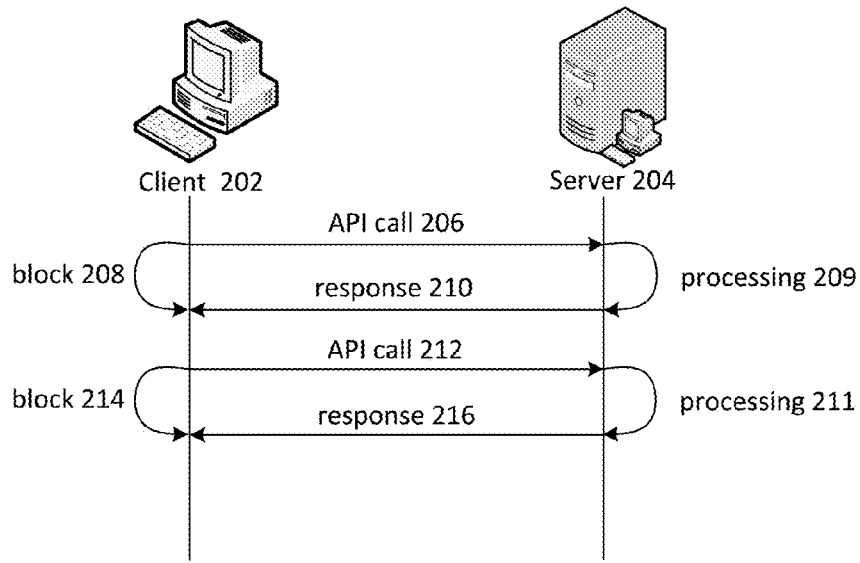
FIG. 2 depicts an example communications flow of a client requesting a server to perform synchronous API calls.

FIG. 2 depicts an example communications flow of a client requesting a server to perform synchronous API calls. As depicted, the communication flow occurs between client 202 and server 204. In embodiments, client 202 may be client 102 of FIG. 1, and server 204 may be external facing server 106 of FIG. 1.

As depicted, client 202 sends API call 206 to server 204. Client 202 then blocks 208 on receiving a response, while server 204 performs processing 209 to determine that response. That is, the client's thread of execution waits until a response is received from server 204 before that thread of execution continues to execute additional operations. Where the client has only one thread of execution, this may mean that all of client 202 blocks on receiving a response from server 204. When response 210 is received by client 202 from server 204, client 202 may then perform additional processing.

As depicted, this additional processing by client 202 involves sending server 204 another API call 212. Client 202 again blocks 214 until client 202 receives response 216 from server 204. Server 204 sends this response 216 after it finishes performing processing 211 to determine the response.

Figure 3:
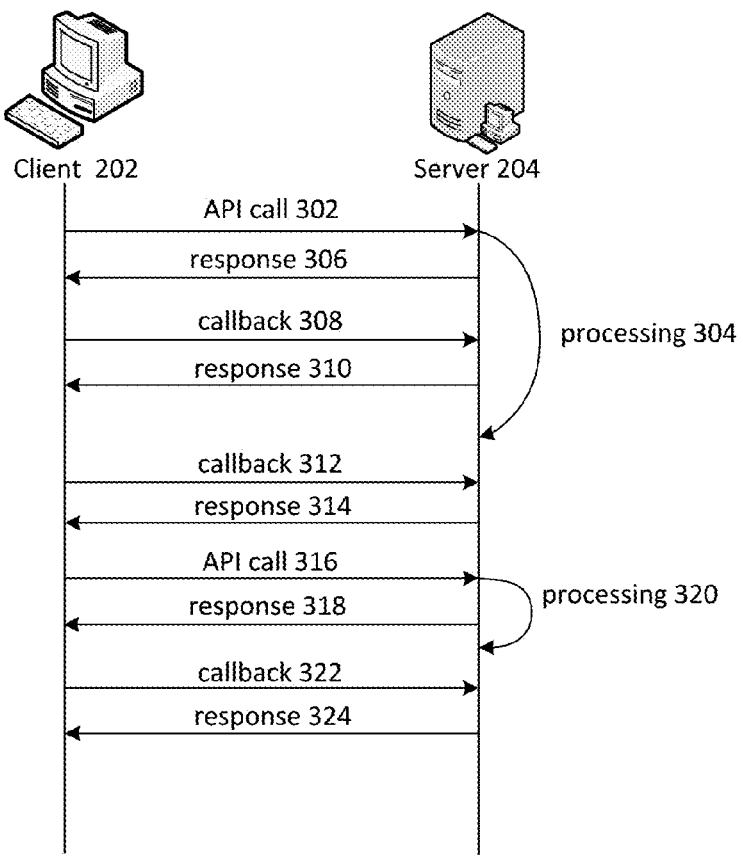
FIG. 3 depicts an example communications flow of a client requesting a server to perform asynchronous API calls.

FIG. 3 depicts an example communications flow of a client requesting a server to perform asynchronous API calls. As discussed above, in an asynchronous API call, the caller does not block until a response to the API call is received. Rather, the caller may perform additional processing, and then utilize a callback function to obtain the result.

As depicted, the communication flow begins where client 202 sends API call 302 to server 204. Server 204 begins performing processing 304, and also sends an initial response 306 back to client 202. This initial response may comprise an identifier so that when client 202 queries server 204 with a callback, client 202 is able to identify the API call that it is referring to.

Client 202 then sends callback 308 to server 204. This callback 308 may include an identifier sent in response 306. In response to callback 308, server 204 sends response 310. Since processing 304 is still ongoing, response 310 may not identify results of processing 304. Likewise, after processing 304 completes, client 202 sends another callback—callback 312. Since processing 304 has completed when server 204 receives callback 312, server 204 may send response 314 which identifies a result of the processing. For instance, where the API call 302 is to start a virtual machine instance, the response 314 may be an indication that the virtual machine instance has been started, and the virtual machine instance is now running.

API call 316 is a call that depends upon API call 302 being processed (API call 316 is a child relative to parent API call 302). For instance, where API call 302 is to start a virtual machine image, API call 316 may be to take a snapshot of that running virtual machine image. In this manner, API call 316 is dependent upon API call 302, because a snapshot of a virtual machine instance may be taken after that virtual machine instance is running. Since client 202 has received response 314 that identifies that the virtual machine instance is running, client 202 then sends this dependent API call 316 to take a snapshot of the virtual machine instance. In response to receiving this API call 316, server 204 begins processing 320 the call by taking a snapshot. Server 204 also sends response 318 to client, which may identify API call 316 in the same manner that response 306 identifies API call 302.

After processing 320 has been completed, client 202 sends callback 322 to server 204, callback 202 identifying the snapshot task that is being undertaken by server 204. Since server 204 has completed the processing 320 of taking the snapshot, server 204 sends response 324, which identifies that a snapshot of the virtual machine instance has been successfully taken.

Figure 4:
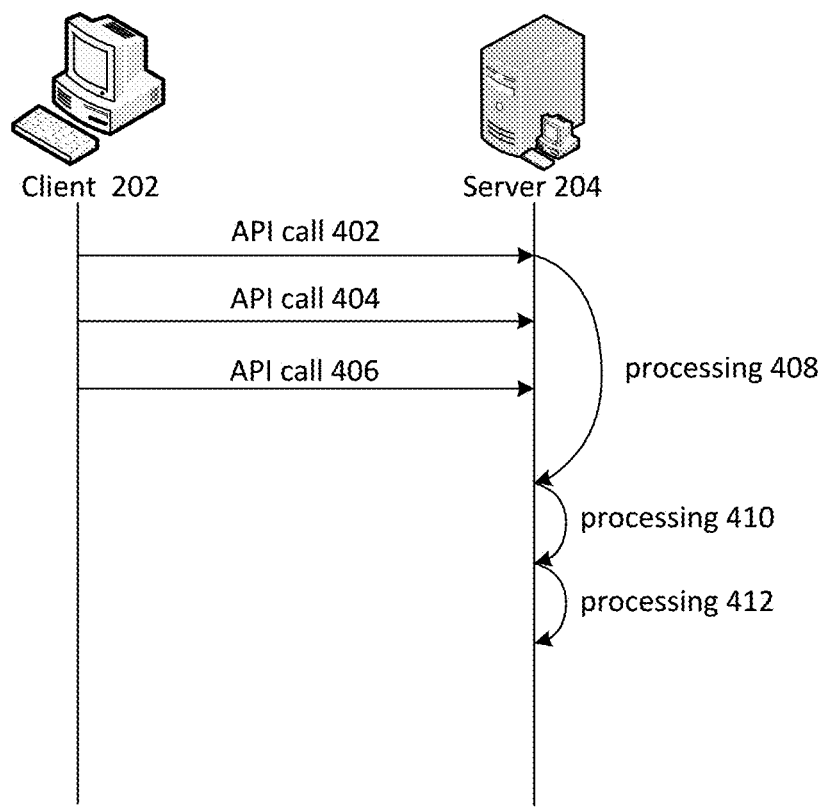
FIG. 4 depicts an example communications flow of a client requesting a server to perform asynchronous API calls with dependencies.

FIG. 4 depicts an example communications flow of a client requesting a server to perform asynchronous API calls with dependencies. In contrast with FIG. 3, where client 202 must wait until server 204 has finished processing 304 the first API call 302 before client 202 may send server 204 the dependent API call 316, in FIG. 4, client 202 need not wait to send server 204 multiple dependent API calls.

Here, client 202 sends server 204 API call 402, and server 204 begins processing 408 API call 402. Before server 204 has completed processing 408, client 202 sends server 204 two additional API calls that depend on API call 402—API call 404 and API call 406 (API calls 404 and 406 are children relative to parent API call 402). For instance, API call 402 may be to upload a virtual machine volume to server 204 or to another computer that server 204 may direct to perform operations. API call 404 may be to register a virtual machine image from that virtual machine volume after that virtual machine volume has uploaded. This registration API call 404 may take as a parameter an identifier of the virtual machine volume that server 204 provides after the virtual machine volume has been uploaded in response to API call 402. Likewise, API call 406 may be to run an instance of the registered virtual machine, and a parameter of the run API call 406 may be an identifier of the registered virtual machine volume that server 204 provides after the virtual machine volume has been registered in response to API call 404. In this manner, API call 406 is dependent upon API call 404 (and API call 402) because API call 406 takes as a parameter a result from processing API call 404. In turn, API call 404 is dependent upon API call 402 because API call 404 takes as a parameter a result from processing API call 402.

When server 204 finishes processing 408 API call 402, server 204 may then perform processing 410 on API call 404, and when that completes, perform processing 412 on API call 406. In this manner, client 202 may send these API calls with dependencies to server 204 without waiting on an API call from which another API call depends to first complete.

Figure 5:
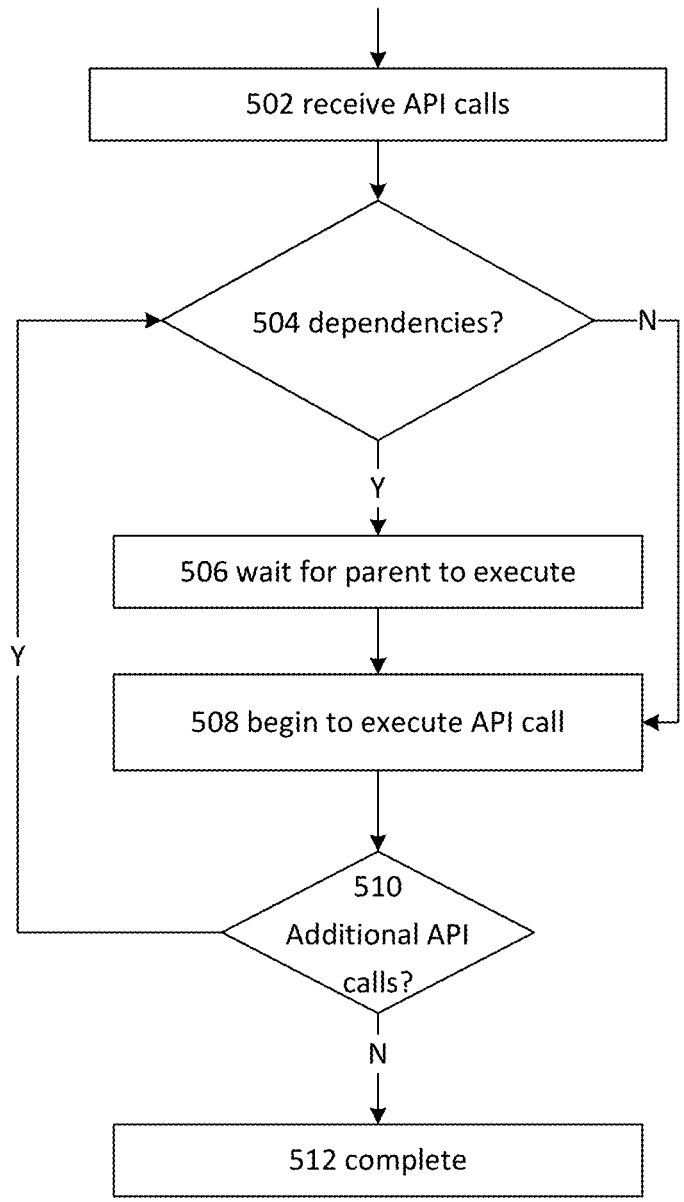
FIG. 5 depicts example operating procedures for performing API calls with dependencies.

FIG. 5 depicts example operating procedures for performing API calls with dependencies. The operations of FIG. 5 may be implemented in external facing server 106 of FIG. 1. It may be appreciated that there are embodiments of the present disclosure that implement fewer operations than depicted in FIG. 5, or implement the operations of FIG. 5 in a different order than as depicted here.

Operation 502 depicts receiving API calls. In embodiments, a first and second asynchronous API call may be received from a client computer (such as client 102 of FIG. 1), and they are both received before the first asynchronous API call has been fully executed to determine a result. In a conventional manner, the client would send each asynchronous API call only after the call from which it depends has fully executed. In contrast, in FIG. 5, all of the API calls may be sent to a server at once, regardless of dependencies.

Examples of these dependencies within asynchronous API calls are as follows. For instance, the first asynchronous API call may be to upload a virtual machine image, and the second asynchronous API call is to register the uploaded virtual machine image. These two calls may have a dependency because a result of executing the first asynchronous API call is an identifier of the uploaded virtual machine image, and a parameter used in the second asynchronous API call is an identifier of that uploaded virtual machine image.

In another example, the first asynchronous API call is to register a virtual machine image, and the second asynchronous API call is to run a virtual machine based on the registered virtual machine image. These two calls may have a dependency because a result of executing the first asynchronous API call is an identifier of the registered virtual machine image, and a parameter used in the second asynchronous API call is an identifier of that identifier of the registered virtual machine image.

As used herein an API call may be considered to be an asynchronous API call because a thread of execution of the client computer from which the first asynchronous API call is received does not wait until execution of the first asynchronous API call has been completed to perform additional operations. That is, the thread of execution of client computer that sent the asynchronous API call to the server does not block on receiving a result of executing that asynchronous API call. Rather, that thread of execution may continue while that asynchronous API call is processed by the server.

In embodiments, an asynchronous API call comprises a hypertext transfer protocol (HTTP) or hypertext transfer protocol secure (HTTPS) uniform resource locator (URL)—e.g., https://[example website].com/?Action=Monitor Instances&InstanceId.1=i-43a4412a&InstanceId.2=i-23a3397d&AUTHPARAMS. In embodiments, a parameter of such an asynchronous API call is found within the query string of that URL—the portion of that URL to the right of the "?".

After operation 502 has completed, the operations proceed to operation 504. Operation 504 depicts determining whether there are dependencies among the received API calls. That is, operation 504 may comprise determining that a parameter of the second asynchronous API call is based on the result of the first asynchronous API call. In embodiments, the client computer may separately indicate to the server that the asynchronous API calls contain a dependency. There are other ways that a server may determine that the asynchronous API calls contain a dependency. A child API call may include at least part of the parent API call (or an indication of the parent API call) as a parameter to that child API call. Additionally, the client may identify dependent API calls by tagging the two calls, such as with a sequence number or a key value pair. Where two API calls have the same tag, the server may recognize them as containing a dependency.

Additionally, embodiments may include configuring the server to determine that there is a dependency from parsing the requests and seeing a tag or a parent API call as a parameter to a child API call. In response, the server may cause the dependent request to be queued until the parent completes. Once that parent completes, the server may rewrite the queued child API call and issue it to a service that implements a function identified in the child API call. This parsing logic may be implemented in a web server, or in each service, where multiple services exist on the server side. The web service may issue the child API calls to applicable services, and the services may then queue the child API calls until the dependencies are resolved from the parent API calls being fully processed.

Where there are dependencies, the process flow proceeds to operation 506. Where there are not dependencies, the process flow proceeds to operation 508.

Operation 506 depicts waiting for the parent call to execute. This may comprise first executing the parent asynchronous API call. In embodiments, executing an asynchronous API call produces one result at the start of execution and another result at the completion of execution. For instance, starting to execute the asynchronous API call may produce a result that indicates that execution has started. When the asynchronous API call has been fully executed, a second, different result may be produced. This result may be the result of actually processing the asynchronous API call. For instance, where the asynchronous API call is to upload a virtual machine image, the result of successfully processing that asynchronous API call may be an identifier of the uploaded virtual machine image that may be referenced in other API calls. After the parent asynchronous API call has executed, the process flow proceeds to operation 508.

In embodiments, there may be multiple parent API calls and multiple child API calls. For instance, the parent API calls may be starting VM instances, and the child API calls may involve performing operations with those VM instances (e.g., taking snapshots of those instances). In such a case, while there are dependencies between a parent API call and a child API call, there is not a dependency between a specific parent and a specific child. Rather, there is a dependency between the group of parents as a whole and the group of children as a whole. When each parent call is completed may be nondeterministic (e.g., the order in which the parent calls are completed may not be known ahead of time). In embodiments, a certain child call may be processed using the result of the first parent call that is completed, and then another child call may be processed using the result of the second parent call that is completed, etc. In embodiments, the group of parents and group of children may be identified as having dependencies between the groups.

Operation 508 depicts beginning to execute the child API call. The child API call may utilize as a parameter a result from executing the parent API call. In embodiments, a callback API call is used to determine the result of executing the parent API call. For instance, the parent API call may be a call to import a volume, the child API call may be to take a snapshot of the volume, and the callback API call may be to describe one or more volumes that a user account associated with the third asynchronous API call has permission to access. In such embodiments, where the client computer identifies a callback API call to the server for determining the result of the parent API call, the client computer may also provide information on how to identify the result within the greater results returned by the callback. For instance, where the callback is to identify all volumes that a user account associated with the third asynchronous API call has permission to access, the result of the parent API call may be just one of those volumes. In such a case, the client computer may provide some identifying characteristic of this volume that is being imported so that it may be identified within the multiple results from the callback.

An example API call to import an instance may be as follows. This example creates an import instance task that migrates a 32-bit VM into the East Region of a group of servers:
https://[example website].com/?Action=ImportInstance&LaunchSpecification.Architecture=x86_64&Launch Specification.InstanceType=m1.xlarge&DiskImage.1. Image.Format=VMDK&DiskImage.1.Image. Bytes=1179593728&DiskImage.1.Image.ImportManifest Url=https://[example website].com/mybucket/a3a5e1b6-590d-43cc-97c1-15c7325d3f41/ OS_2008_Server_Data_Center_SP2_32-bit.vmdkmanifest.xml?AccessKeyId=AKIAIOSFODNN7 EXAMPLE&Expires=1294855591& Signature=5snej01TlTtL0uR7KExtEXAMPLE%3D&Disk Image.1.Volume.Size=12 &Platform=OS_PLATFORM&AUTHPARAMS An example API call to take a snapshot of a volume may be as follows. This example creates a snapshot of volume vol-4d826724:
https://[example website].com/?Action=CreateSnapshot&VolumeId=vol-4d826724&Description=Daily+Backup&AUTHPARAMS An example API call to describe instances may be as follows. The following example describes an instance running in Amazon VPC with instance ID i-7a00642e.
https://[example website].com/ ?Action=DescribeInstances& Filter.1.Name=instance-id &Filter.1.Value.1=i-7a00642e&AUTHPARAMS In response to this API call, the following result may be obtained, which may be parsed to determine whether the instance that is being imported has been successfully imported yet:

```
<DescribeInstancesResponse xmlns="http://[example website].
com/doc/2012-10-01/">
    <requestId>7f5f05d5-1a11-4ca9-9608-07dd351487a5</requestId>
    <reservationSet>
      <item>
        <reservationId>r-0ece705a</reservationId>
        <ownerId>053230519467</ownerId>
        <groupSet/>
        <instancesSet>
          <item>
            <instanceId>i-7a00642e</instanceId>
            <imageId>ami-1cd4924e</imageId>
            <instanceState>
              <code>16</code>
              <name>running</name>
            </instanceState>
            <privateDnsName/>
            <dnsName/>
            <reason/>
            <keyName>VPCKey</keyName>
            <amiLaunchIndex>0</amiLaunchIndex>
```

-continued

```
            <productCodes/>
            <instanceType>c1.medium</instanceType>
            <launchTime>2012-06-28T17:41:48.000Z</launchTime>
            <placement>
              <availabilityZone>ap-southeast-1b</availabilityZone>
              <groupName/>
              <tenancy>default</tenancy>
            </placement>
            <platform>OS_PLATFORM</platform>
            <monitoring>
              <state>disabled</state>
            </monitoring>
            <subnetId>subnet-c53c87ac</subnetId>
            <vpcId>vpc-cc3c87a5</vpcId>
            <privateIpAddress>10.0.0.12</privateIpAddress>
            <ipAddress>46.51.219.63</ipAddress>
            <sourceDestCheck>true</sourceDestCheck>
            <groupSet>
              <item>
                <groupId>sg-374b565b</groupId>
                <groupName>quick-start-3</groupName>
              </item>
            </groupSet>
            <architecture>x86_64</architecture>
            <rootDeviceType>ebs</rootDeviceType>
            <rootDeviceName>/dev/sda1</rootDeviceName>
            <blockDeviceMapping>
              <item>
                <deviceName>/dev/sda1</deviceName>
                <ebs>
                  <volumeId>vol-9e151bfc</volumeId>
                  <status>attached</status>
                  <attachTime>2012-06-28T17:42:05.000Z</attachTime>
                  <deleteOnTermination>true</deleteOnTermination>
                </ebs>
              </item>
            </blockDeviceMapping>
            <virtualizationType>hvm</virtualizationType>
            <clientToken>JN1xa1340905307390</clientToken>
            <tagSet>
              <item>
                <key>Name</key>
                <value>SingleENI</value>
              </item>
            </tagSet>
            <hypervisor>xen</hypervisor>
            <networkInterfaceSet>
              <item>
                <networkInterfaceId>eni-d83388b1</networkInterfaceId>
                <subnetId>subnet-c53c87ac</subnetId>
                <vpcId>vpc-cc3c87a5</vpcId>
                <description>Primary network interface</description>
                <ownerId>053230519467</ownerId>
                <status>in-use</status>
                <privateIpAddress>10.0.0.12</privateIpAddress>
                <sourceDestCheck>true</sourceDestCheck>
                <groupSet>
                  <item>
                    <groupId>sg-374b565b</groupId>
                    <groupName>quick-start-3</groupName>
                  </item>
                </groupSet>
                <attachment>
                  <attachmentId>eni-attach-31b87358</attachmentId>
                  <deviceIndex>0</deviceIndex>
                  <status>attached</status>
                  <attachTime>2012-06-28T17:41:48.000Z</attachTime>
                  <deleteOnTermination>true</deleteOnTermination>
                </attachment>
                <association>
                  <publicIp>46.51.219.63</publicIp>
                  <ipOwnerId>053230519467</ipOwnerId>
```

-continued

```
        </association>
        <privateIpAddressesSet>
            <item>
                <privateIpAddress>10.0.0.12</privateIp-
Address>
                <primary>true</primary>
                <association>
                    <publicIp>46.51.219.63</publicIp>
                    <ipOwnerId>053230519467</ipOwnerId>
                </association>
            </item>
            <item>
                <privateIpAddress>10.0.0.14</privateIp-
Address>
                <primary>false</primary>
                <association>
                    <publicIp>46.51.221.177</publicIp>
                    <ipOwnerId>053230519467</ipOwnerId>
                </association>
            </item>
        </privateIpAddressesSet>
    </item>
    </networkInterfaceSet>
</item>
</instancesSet>
</item>
</reservationSet>
</DescribeInstancesResponse>
```

In embodiments, the server is a Web server that works in conjunction with disparate systems to execute the multiple API calls. Each of the two API calls may be sent by the server to different systems for execution. These two systems may perform different roles (e.g., one may execute virtual machine instances while another may store snapshots of virtual machine instances). In embodiments, one system may be an internal system that is accessible by the server via an internal network, while the other system may be an external system that is accessible by the server via the Internet, and which is owned and/or controlled by a different entity or company.

Operation 510 depicts determining whether there are additional API calls to execute. Where there are additional API calls to execute, the process flow returns to operation 504. Where there are no additional API calls to execute, the process flow moves to operation 512.

At operation 512, the operating procedures of FIG. 5 are complete. In embodiments, operation 512 may include storing a result of executing the asynchronous API calls in a computer memory.

Figure 6:
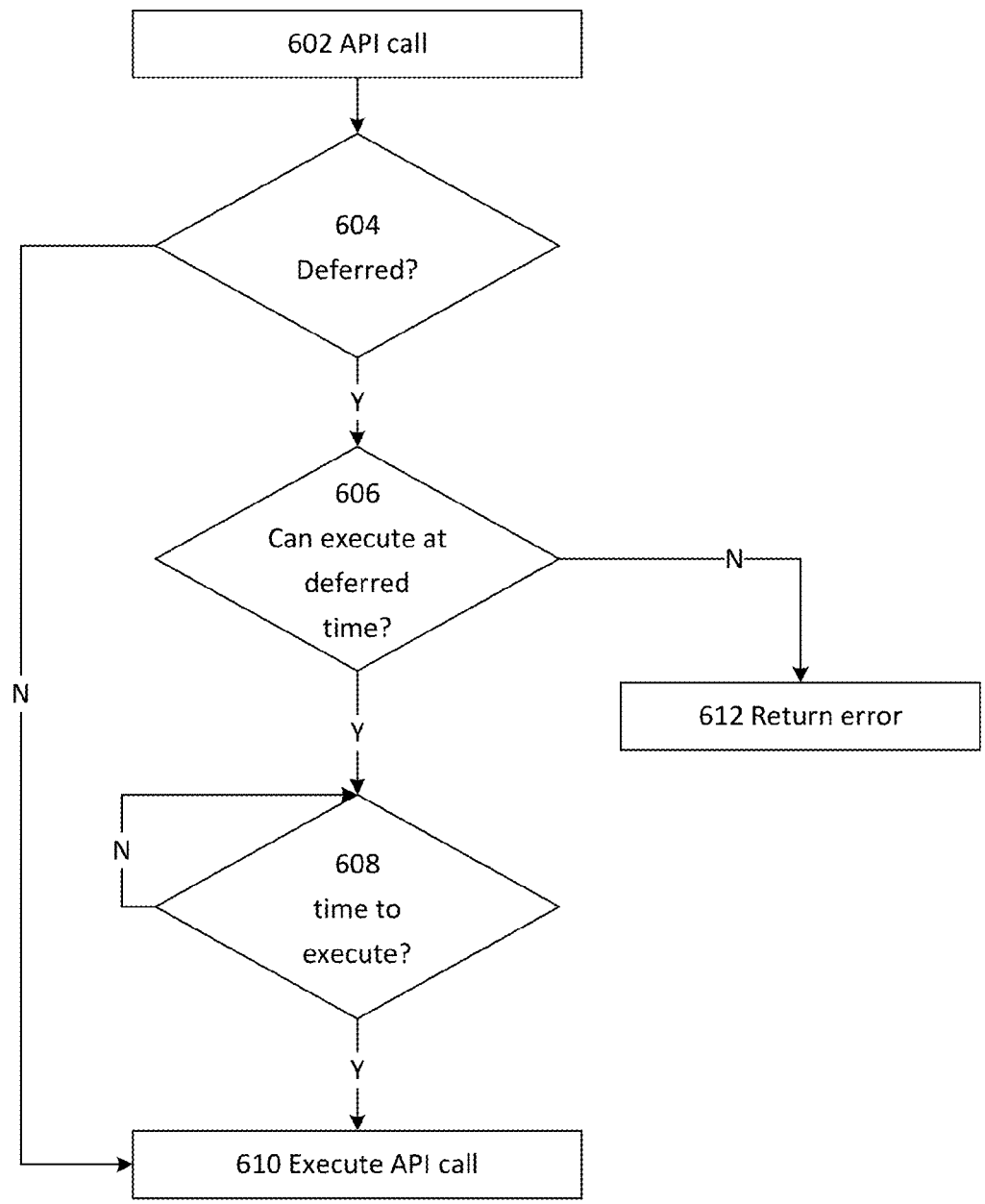
FIG. 6 depicts example operating procedures for performing deferred API calls with dependencies.

FIG. 6 depicts example operating procedures for performing deferred API calls with dependencies. The operations of FIG. 6 may be implemented in external facing server 106 of FIG. 1. It may be appreciated that there are embodiments of the present disclosure that implement fewer operations than depicted in FIG. 6, or implement the operations of FIG. 6 in a different order than as depicted here.

Operation 602 depicts receiving an API call. In embodiments, this API call is received from a client computer, such as client 102 of FIG. 1. The API call may be an asynchronous API call. In embodiments, the API call is asynchronous because a thread of execution of the client computer from which the first asynchronous API call is received does not wait until execution of the first asynchronous API call has been completed to perform additional operations.

In embodiments, the API call comprises a hypertext transfer protocol (HTTP) or hypertext transfer protocol secure (HTTPS) uniform resource locator (URL). In embodiments, a parameter of the API call comprises at least part of a query string of the URL.

Operation 604 depicts determining whether the received API call is deferred. In embodiments, operation 604 may include determining that a parameter of the asynchronous API call indicates a future time at which the asynchronous API call is to be executed. Where the received API call is deferred, the process flow moves to operation 606. Where the deferred API call is not deferred, the process flow moves to operation 610.

Operation 606 depicts determining whether the deferred API call may be executed at the indicated time. In embodiments, operation 606 comprises determining that the API call may be executed at the future time based on a current set of tasks to be performed at the future time. For instance, there may already be tasks scheduled for the future time, and there may be a limit to how many tasks may be scheduled for the future time. That is, there may be an allotted capacity of a service provider environment, and the amount of scheduled work that is already scheduled at a particular future time may exceed this allotted capacity.

In embodiments, operation 606 comprises determining that executing the API call comprises starting a virtual machine instance, and then determining that a number of virtual machine instances scheduled to run at the future time is below a threshold value. For instance, only a set number of virtual machine instances (e.g., 30) may be allowed to run on a given server at a given time.

In embodiments, operation 606 comprises determining that the asynchronous API call may be executed at the future time based on an allowed amount of processing at the future time associated with the user account that is associated with the API call. A given user account may have purchased, or otherwise acquired, only a set amount of processing resources for a given time. A check may be performed to ensure that performing this deferred API call will not exceed those processing resources. In embodiments, the allowed amount of processing at the future time associated with the user account differs from an allowed amount of processing at the current time associated with the user account. That is, the amount of processing resources that a user account may engage may change over time. For instance, a user account may have acquired more processing resources capacity, but only as of a certain date.

In embodiments, it may originally be determined that the asynchronous API call may be executed at the future time, and then circumstances change that prevent that call from being executed at that time. For instance, a server on which the call would be processed may fail, or the load on the server may unexpectedly increase and the priority to execute this call is low (for instance, because the customer paid a lower rate in exchange for not being guaranteed that his call would execute). In such embodiments, the client computer (or customer account associated with the API call) may be informed of this change.

In other embodiments, there may be fees associated with processing API calls. Different customer accounts may pay different fees, or one customer account may pay different fees for different API calls. For instance, there may be a higher fee for a guarantee that a call will be processed at a given time, and a lower fee for a guarantee only that a call will be processed only if possible after processing all high-priority calls. Then, when a scenario occurs where too much processing requested at a given time, a server may perform a triage on the requested calls. Given the two-status embodiment above (higher fee and lower fee), it may be initially determined that the lower fee calls will not be processed in favor of the higher fee calls, until the projected processing is below a maximum amount. In embodiments, there may be a bidding system for API calls to be processed at a given time, so that a requestor that is sufficiently motivated and funded may ensure that its request will be executed at that time.

In embodiments, it may be determined that the API call will or will not be processed at the future time based on other deferred API calls that are already pending. An amount of processing resources used to process all of those API calls may be determined, and compared against an amount of processing resources available on the computer upon which they are processed. In other embodiments, trending data may be used. For instance, a projection may be made that the increased load that has been present over the past few hours will continue to increase, or that historical data about load at a particular time (e.g., on Sunday at 6 PM GMT) is at a certain level.

In other embodiments, projections may be made against a budget of the entity requesting the API call be processed. The requestor may pre-pay, or otherwise have a maximum amount that it is paying per month. Where the requestor is charged based on an amount of usage, the total charge can be projected up through the future time when the API call would be processed. Where the total charge would exceed a threshold (e.g., the amount of money that the requestor has pre-paid), the requestor may be notified of this, and either add funds, or reschedule the API call for a time when the requestor will have provided sufficient funds (e.g., wait to process the API call until next month, when the requestor is allocated a new amount of usage).

In other embodiments, a risk tolerance may be expressed for the API call, for instance as a parameter to the API call. The risk tolerance may express the requestor's tolerance for risking that the call may not be processed at the future time. For instance, one requestor may be a corporation that needs a certain number of VMs to be running when it launches a new product. If that number of VMs cannot be guaranteed, the requestor will go elsewhere. Another requestor may be a college student who needs some processing done for his term paper, but he has weeks to do the processing, and can wait. In such a scenario, the corporation may have a low tolerance for risk while the college student has a higher tolerance for risk.

Where the API call cannot or will not be executed at the specified deferred time, the process flow moves to operation 612. Where the API call can and will be executed at the specified deferred time, the process flow moves to operation 608. In embodiments, in addition to moving to operation 608, the server may send the client computer an initial indication that the API call will be executed at the specified deferred time, and send this indication before that deferred time.

Operation 608 depicts determining whether it is time to execute the deferred API call. In embodiments, operation 608 may comprise periodically checking the deferred time against the current time. Where the deferred time has been reached, the process flow moves to operation 610. Where the deferred time has not yet been reached, the process flow loops at operation 608 until the deferred time is reached.

Operation 610 depicts executing the API call. Where the API call includes parameters in addition to the deferred time, executing the API call may comprise executing the API call using the parameters. In embodiments, operation 608 comprises storing a result of executing the asynchronous API call in a computer memory.

Operation 612 depicts returning an error. This error may indicate that it was determined at operation 606 that the API call could not or would not be executed at the specified deferred time, and it may be sent from the server to the client computer.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems, and other devices capable of communicating via a network. These devices may be considered to be computing nodes, along with each virtual machine of one or more virtual machines that executes on such devices.

Most embodiments utilize at least one network that would be familiar to those skilled in the art for supporting communications using any of a variety of protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, JAVA servers and business application servers. The server(s) also may be capable of executing programs or scripts in response requests from user devices, such as by executing one or more Web applications that may be implemented as one or more scripts or programs written in any programming language, such as JAVA C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD), or other optical storage, magnetic cassettes, magnetic tape, magnetic disk storage, or other magnetic storage devices, or any other medium that can be used to store the desired information and that can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

While the present disclosure has been made in connection with preferred embodiments, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. Aspects of the disclosure may be implemented with computer-readable storage media, which do not include signals, and/or computer-readable communication media. Thus, the invention, or certain aspects or portions thereof, may take the form of program code (i.e., instructions) embodied in tangible, or non-transitory, media, such as floppy diskettes, CD-ROMs, hard drives, or any other machine-readable storage medium. Likewise, certain aspects or portions of the disclosure may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only, and not considered as encompassing all aspects of the disclosure.

What is claimed:

1. A method for implementing asynchronous application programming interface (API) calls with dependencies, comprising:
receiving a first asynchronous API call and a second asynchronous API call from one or more client computers, the second asynchronous API call being received before determining a result of the first asynchronous API call, the second asynchronous API call being dependent upon the result of the first asynchronous API call;

determining that a parameter of the second asynchronous API call is based on the result of the first asynchronous API call;

processing the first asynchronous API call;

after completing processing of the first asynchronous API call, processing the second asynchronous API call using the result of the first asynchronous API call as the parameter of the second asynchronous API call; and storing a result of processing the second asynchronous API call in a computer memory.

2. The method of claim 1, wherein the first asynchronous API call causes the upload of a virtual machine image, the result of the first asynchronous API call comprises an identifier of the uploaded virtual machine image, the second asynchronous API call causes registration of the uploaded virtual machine image, and the parameter of the second asynchronous API call identifies the uploaded virtual machine image.

3. The method of claim 1, wherein the first asynchronous API call causes the registration of a virtual machine image, the result of the first asynchronous API call comprises an identifier of the registered virtual machine image, the second asynchronous API call causes a virtual machine to execute based on the registered virtual machine image, and the parameter of the second asynchronous API call identifies the registered virtual machine image.

4. The method of claim 1, wherein the first asynchronous API call is non-blocking.

5. The method of claim 1, wherein the first asynchronous API call is embedded in a hypertext transfer protocol (HTTP) uniform resource locator (URL) or hypertext transfer protocol secure (HTTPS) URL.

6. The method of claim 5, wherein a parameter of the first asynchronous API call comprises at least part of a query string of the URL.

7. A system for implementing asynchronous application programming interface (API) calls with dependencies, comprising:

a memory storing instructions that, upon execution by a processor, cause the system to at least:

receive a first asynchronous API call and a second asynchronous API call from one or more computing nodes, the second asynchronous API call being dependent upon a result from the first asynchronous API call;

determine that a parameter of the second asynchronous API call is based on the result of the first asynchronous API call; and after processing the first asynchronous API call, processing the second asynchronous API call using the result of the first asynchronous API call as the parameter of the second asynchronous API call.

8. The system of claim 7, wherein the memory further bears stores instructions that, upon execution by the processor, cause the system to at least:

determine that the first asynchronous API call is to be processed by a first computing node and the second asynchronous API call is to be processed by a second computing node;

wherein the instructions that, upon execution by the processor, cause the system to at least process the first asynchronous API call further cause the system to at least send the first asynchronous API call to the first computing node; and wherein the instructions that, upon execution by the processor, cause the system to at least process the second asynchronous API call further cause the system to at least send the second asynchronous API call to the second computing node.

9. The system of claim 8, wherein the first computing node and the second computing node are configured to perform different functions.

10. The system of claim 8, wherein the first computing node is an external-network-facing node and the second computing node is an internal-network-facing node.

11. The system of claim 8, wherein the instructions that, upon execution by the processor, cause the system to at least determine that the first asynchronous API call is to be processed by a first computing node and the second asynchronous API call is to be processed by a second computing node are processed by a web server via an external network, the web server being communicatively coupled to the first computing node or the second computing node via an internal network.

12. The system of claim 7, wherein the second asynchronous API call is received before determining a result of the first asynchronous API call.

13. The system of claim 7, wherein the instructions that, upon execution by the processor, cause the system to at least determine that the parameter of the second asynchronous API call is based on the result of the first asynchronous API call further cause the system to at least:

receive a third asynchronous API call from the computer, and an indication of a result of the third asynchronous API call that identifies the result of the first asynchronous API call; and use the result of the third asynchronous API call as the parameter to the second asynchronous API call.

14. The system of claim 13, wherein the first asynchronous API call is a call to import a volume, the second asynchronous API call is to take a snapshot of the volume, and the third asynchronous API call is to describe one or more volumes that a user account associated with the third asynchronous API call has permission to access.

15. The system of claim 7, wherein the system produces a second result of the first asynchronous API call in response to beginning to process the first asynchronous API call, and produces the result of the first asynchronous API call in response to completing processing of the first asynchronous API call.

16. The system of claim 7, wherein the second asynchronous API call is received from the one or more computing nodes before the first asynchronous API call is received from the one or more computing nodes.

17. A non-transitory computer-readable medium for implementing asynchronous application programming interface (API) calls with dependencies, storing computer-readable instructions that, when executed on a computer, cause the computer to perform operations comprising:

receiving a first asynchronous API call and a second asynchronous API call;

determining that a parameter of the second asynchronous API call is based on the result of the first asynchronous API call; and after processing the first asynchronous API call, processing the second asynchronous API call using the result of the first asynchronous API call as the parameter of the second asynchronous API call.

18. The non-transitory computer-readable medium of claim 17, wherein the first asynchronous API call is to upload a virtual machine image, the result of the first asynchronous API call is an identifier of the uploaded virtual machine image, the second asynchronous API call is to register the uploaded virtual machine image, and the parameter of the second asynchronous API call is the identifier of the uploaded virtual machine image.

19. The non-transitory computer-readable medium of claim 17, wherein the first asynchronous API call causes the upload of a virtual machine image, the result of the first asynchronous API call comprises an identifier of the uploaded virtual machine image, the second asynchronous API call causes registration of the uploaded virtual machine image, and the parameter of the second asynchronous API call identifies the uploaded virtual machine image.

20. The non-transitory computer-readable medium of claim 17, wherein a thread of execution from a client computer from which the first asynchronous API call is received performs additional operations before processing the first asynchronous API call has been completed.

21. The non-transitory computer-readable medium of claim 17, wherein the first asynchronous API call is embedded in a hypertext transfer protocol (HTTP) uniform resource locator (URL) or hypertext transfer protocol secure (HTTPS) URL.

22. The non-transitory computer-readable medium of claim 21, wherein a parameter of the first asynchronous API call comprises at least part of a query string of the URL.

23. The non-transitory computer-readable medium of claim 17, wherein determining that the parameter of the second asynchronous API call is based on the result of the first asynchronous API call comprises:
  receiving a third asynchronous API call from the computer, and an indication of a result of the third asynchronous API call that identifies the result of the first asynchronous API call; and
  using the result of the third asynchronous API call as the parameter to the second asynchronous API call.

24. The non-transitory computer-readable medium of claim 23, wherein the first asynchronous API call is a call to import a volume, the second asynchronous API call is to take a snapshot of the volume, and the third asynchronous API call is to describe one or more volumes that a user account associated with the third asynchronous API call has permission to access.

25. The non-transitory computer-readable medium of claim 17, wherein the first asynchronous API call is part of a first group of calls, and further storing computer-readable instructions that, when executed on the computer, cause the computer to perform operations comprising:
  determining that the second asynchronous API call is dependent on any of the first group of calls; and
  processing the second asynchronous API call using the result of the first asynchronous API call as the parameter of the second asynchronous API call, wherein the first asynchronous API call is any of the first group of calls.

* * * * *